US012703611B2

(12) United States Patent
Chen

(10) Patent No.: US 12,703,611 B2
(45) Date of Patent: Aug. 11, 2026

(54) JACK

(71) Applicant: YUN KUAN ENTERPRISE CO., LTD., Tongluo Township, Miaoli County (TW)

(72) Inventor: Wen-Che Chen, Tongluo Township, Miaoli County (TW)

(73) Assignee: YUN KUAN ENTERPRISE CO., LTD., Miaoli County (TW)

( * ) Notice: Subject to any disclaimer, the term of this patent is extended or adjusted under 35 U.S.C. 154(b) by 303 days.

(21) Appl. No.: 18/663,039

(22) Filed: May 13, 2024

(65) Prior Publication Data

US 2025/0346463 A1 Nov. 13, 2025

(51) Int. Cl.
*B66F 1/02* (2006.01)

(52) U.S. Cl.
CPC ..................................... *B66F 1/02* (2013.01)

(58) Field of Classification Search
CPC ...... B66F 1/02; B66F 5/00; B66F 3/42; B66F 3/26; B25B 5/16; B25B 5/06
See application file for complete search history.

(56) References Cited

U.S. PATENT DOCUMENTS

| | | | | |
|---|---|---|---|---|
| 2,731,842 A * | 1/1956 | Braselmann | B66F 1/02 | 254/105 |
| 7,513,492 B1 * | 4/2009 | Kuo | B25B 5/068 | 269/6 |
| 7,651,078 B2 * | 1/2010 | Geier | F16C 1/18 | 269/170 |
| 8,016,276 B2 * | 9/2011 | Geier | B25B 5/068 | 269/95 |
| 8,850,672 B2 * | 10/2014 | Yang | F16B 2/12 | 24/522 |
| 11,603,297 B1 * | 3/2023 | Chen | B66F 1/02 | |
| 12,545,561 B2 * | 2/2026 | Chen | B66F 1/02 | |
| 2024/0083723 A1 * | 3/2024 | Chen | B66F 1/02 | |
| 2025/0326612 A1 * | 10/2025 | Klöpfer | B66F 1/02 | |
| 2025/0346463 A1 * | 11/2025 | Chen | B66F 1/02 | |

* cited by examiner

*Primary Examiner* — Lee D Wilson

(57) ABSTRACT

A jack contains: a body, an actuation rod, and a descending device. The body includes a first support sheet formed on an end thereof, and the actuation rod is movably received in the body and includes a second support sheet corresponding to the first support sheet. The actuation rod drives the first support and the second support to move away from each other in a first moving direction, and the actuation rod drives the first support and the second support to move close to each other in a second moving direction. Thereby, the jack is capable of expanding the commodity gradually and contains the descending device which is pressed to move the first support sheet and the second support sheet in the first moving direction or the second moving direction, thus retracting the jack gradually by pressing the adjustment grip repeatedly.

1 Claim, 6 Drawing Sheets

JACK

TECHNICAL FIELD

The present invention relates to a jack is capable of expanding the commodity gradually and contains the descending device which is pressed to move the first support sheet and the second support sheet in the first moving direction or the second moving direction, thus retracting the jack gradually by pressing the adjustment grip repeatedly.

BACKGROUND

A conventional clamp structure is disclosed in TW Utility Model No. M284485 and contains a movable portion and a fixed portion opposite to the movable portion, wherein the movable portion is disposed on an end of a guide rod, and the guide rod is slidably mounted on the fixed portion. The fixed portion has a grip and a press bar connected on two ends of a bottom of the fixed portion, wherein the grip has a release sheet, and a drive sheet and the press bar actuate an clamping element and a limiting element which are accommodated in the fixed portion, such that the press bar is pressed repeatedly to pull the guide rod gradually, thus clamping an object by the movable portion and the fixed portion.

When such clamping technology is appliable for a jack, the jack is descended by being manually supported by a user, thus causing using inconvenience.

The present invention has arisen to mitigate and/or obviate the afore-described disadvantages.

SUMMARY

The primary aspect of the present invention is to provide the jack is capable of expanding the commodity gradually and contains the descending device which is pressed to move the first support sheet and the second support sheet in the first moving direction or the second moving direction, thus descending the jack gradually by pressing the adjustment grip repeatedly.

To obtain above-mentioned aspect, a jack provided by the present invention contains: A jack comprising: a body, an actuation rod, and a descending device.

The body includes a first support sheet formed on an end thereof, the actuation rod is movably received in the body and includes a second support sheet formed on an end of the actuation rod and corresponding to the first support sheet, the actuation rod drives the first support and the second support to move away from each other in a first moving direction, and the actuation rod drives the first support and the second support to move close to each other in a second moving direction; the body includes a drive grip rotatably connected on a bottom thereof, an driving mechanism received in a front section of an interior of the body and configured to drive the actuation rod to move in the first moving direction via the drive grip; the body further includes a limiter accommodated in a rear section of the interior thereof, and the limiter has a spring and multiple first defining blocks, the actuation rod is inserted through the multiple first defining blocks, an end of the spring abuts against the multiple first defining blocks so that the multiple first defining blocks movably engages with the actuation rod, and the actuation rod is limited to move in the second moving direction. One first defining block of the limiter has a release stem configured to disengage the actuation rod from the multiple first defining blocks.

The descending device includes a resilient sheet, multiple second defining blocks, a conduct element, a pull bar, and an adjustment grip; the resilient sheet is received in a middle section of the interior of the body, and the body includes a holder defined in the interior thereof and aligned with the resilient sheet, a force gap is defined between the resilient sheet and the holder; the adjustment grip is rotatably connected on the bottom of the body and has an actuating segment configured to abut against the resilient sheet, the multiple defining blocks are accommodated in the middle section of the interior of the body, and the actuation rod is inserted through the multiple second defining blocks, an end of a respective one second defining block of the multiple second defining blocks abuts against the spring, and the other end of the respective one second defining block contacts with the adjustment grip. The multiple second defining blocks do not engage with the actuation rod in a normal state, the conduct element is received in the rear section of the interior of the body and abuts against a respective one first defining block of the multiple first defining blocks; and the pull bar is inserted between the middle section and the rear section of the interior of the body. An end of the pull bar is rotatably connected with the actuating segment, and the other end of the pull bar is rotatably connected with the conduct element.

DETAILED DESCRIPTION

Figure 1:
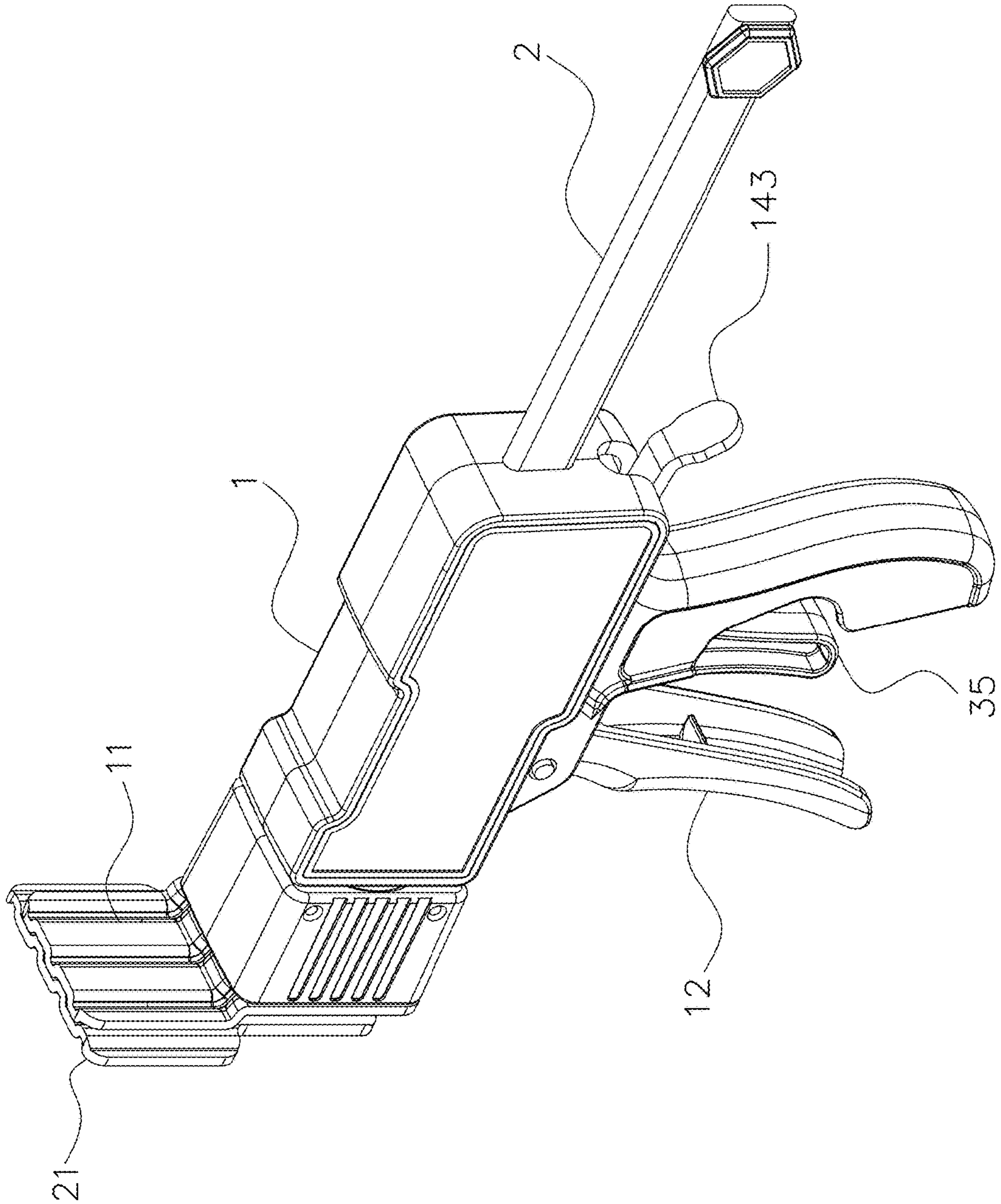
FIG. 1 is a perspective view showing the assembly of a jack according to a preferred embodiment of the present invention.
Figure 2:
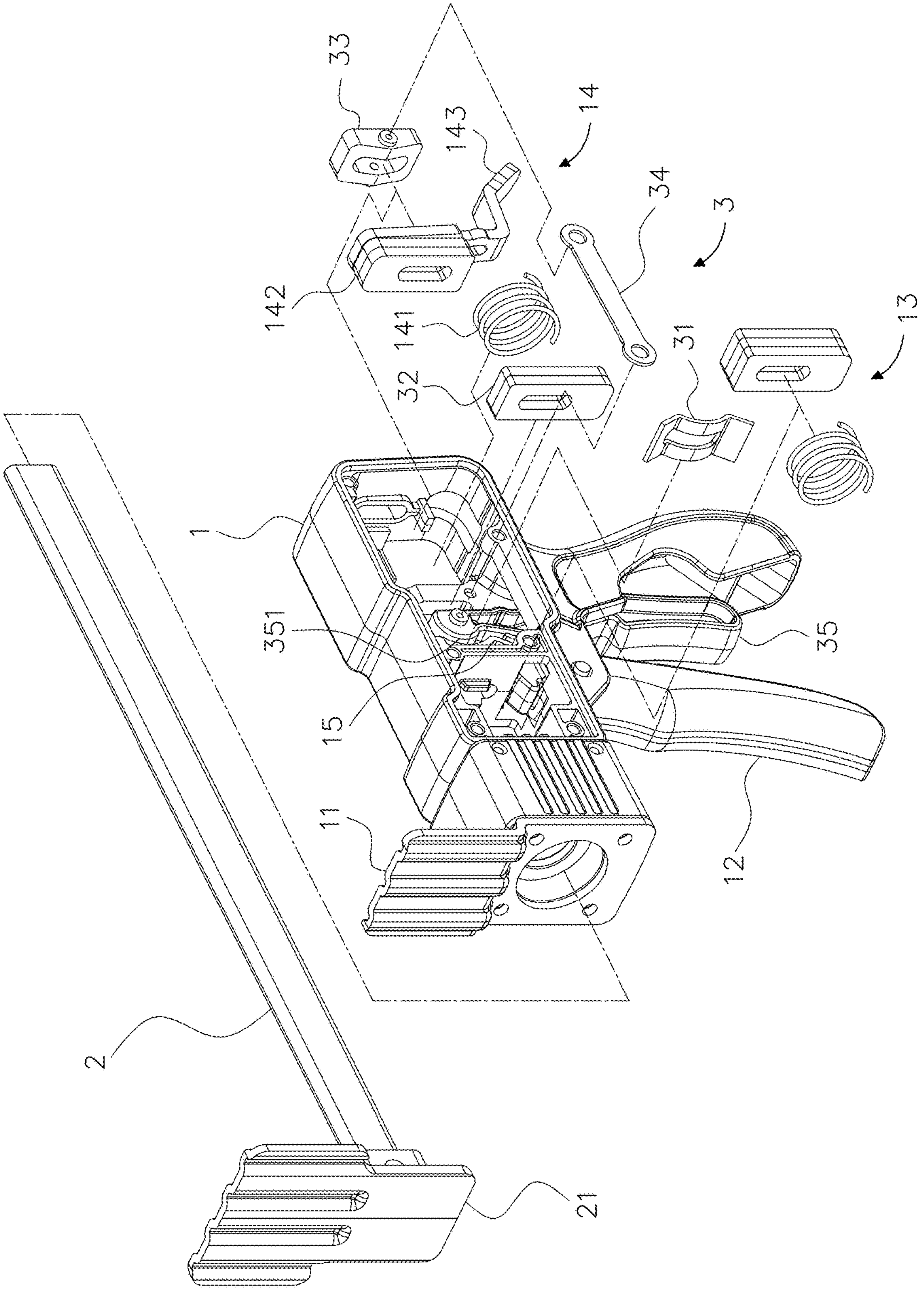
FIG. 2 is a perspective view showing the exploded components of the jack according to the preferred embodiment of the present invention.
Figure 3:
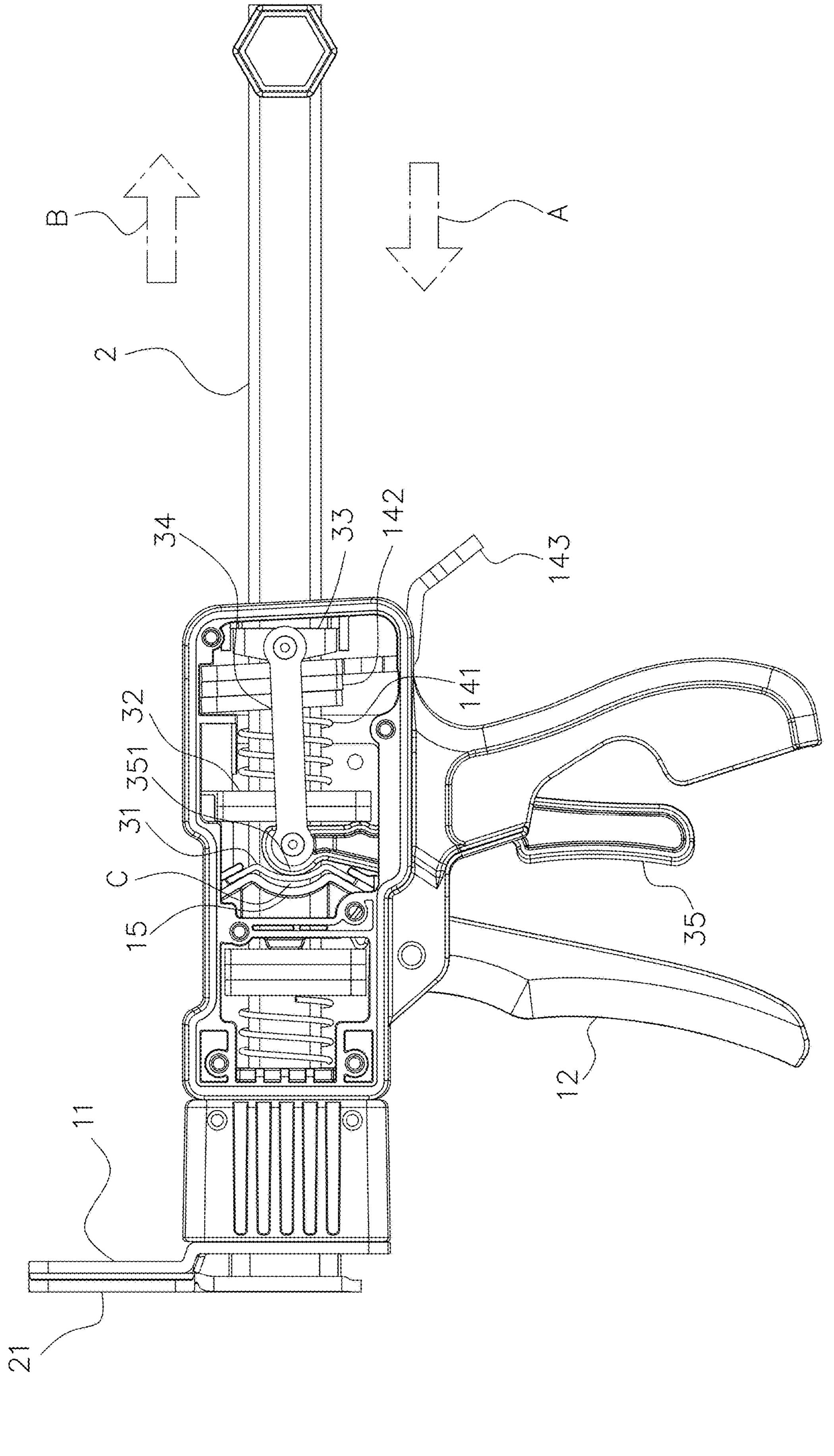
FIG. 3 is a schematic view showing the operation of the jack according to the preferred embodiment of the present invention.
Figure 4:
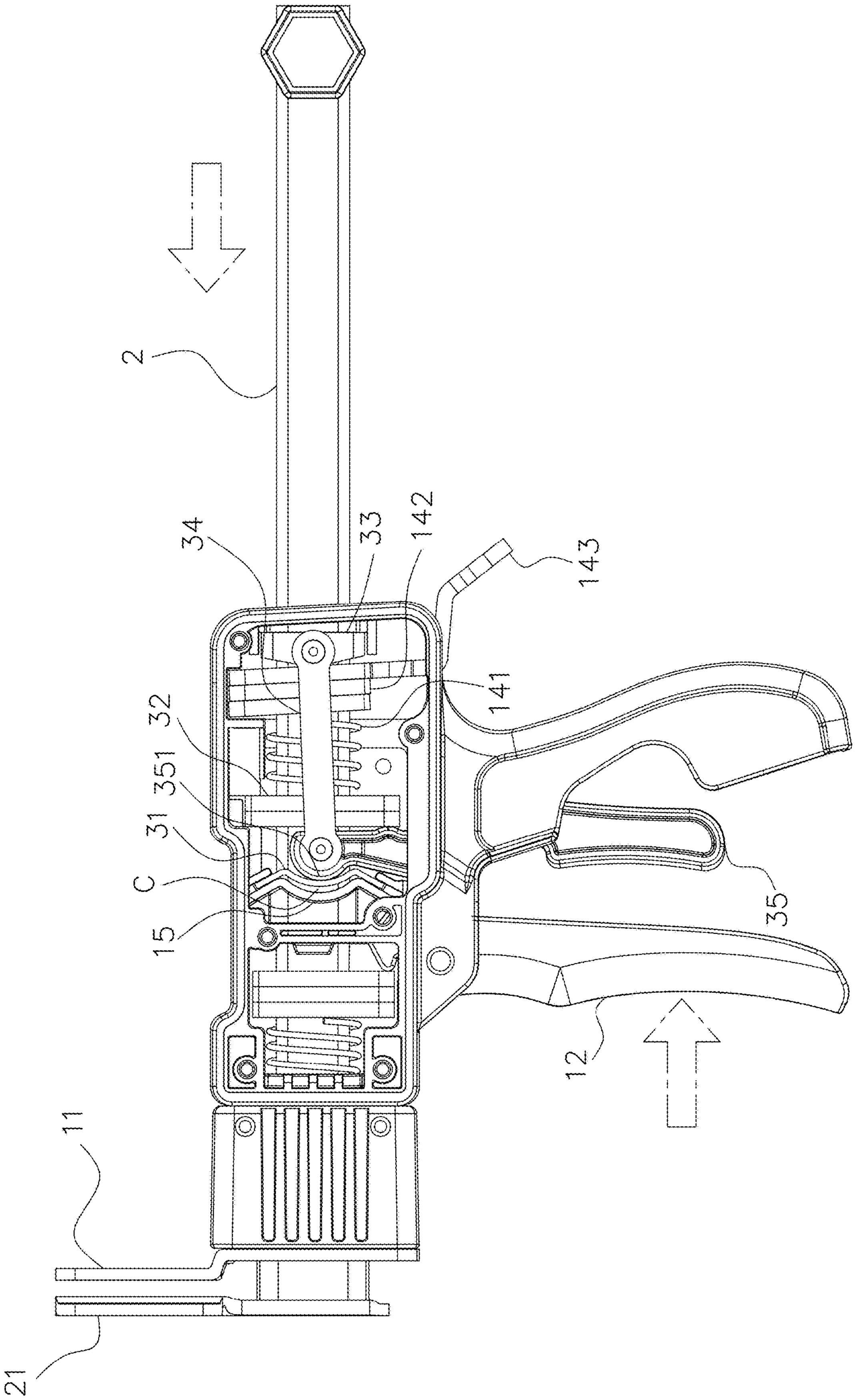
FIG. 4 is another schematic view showing the operation of the jack according to the preferred embodiment of the present invention.
Figure 5:
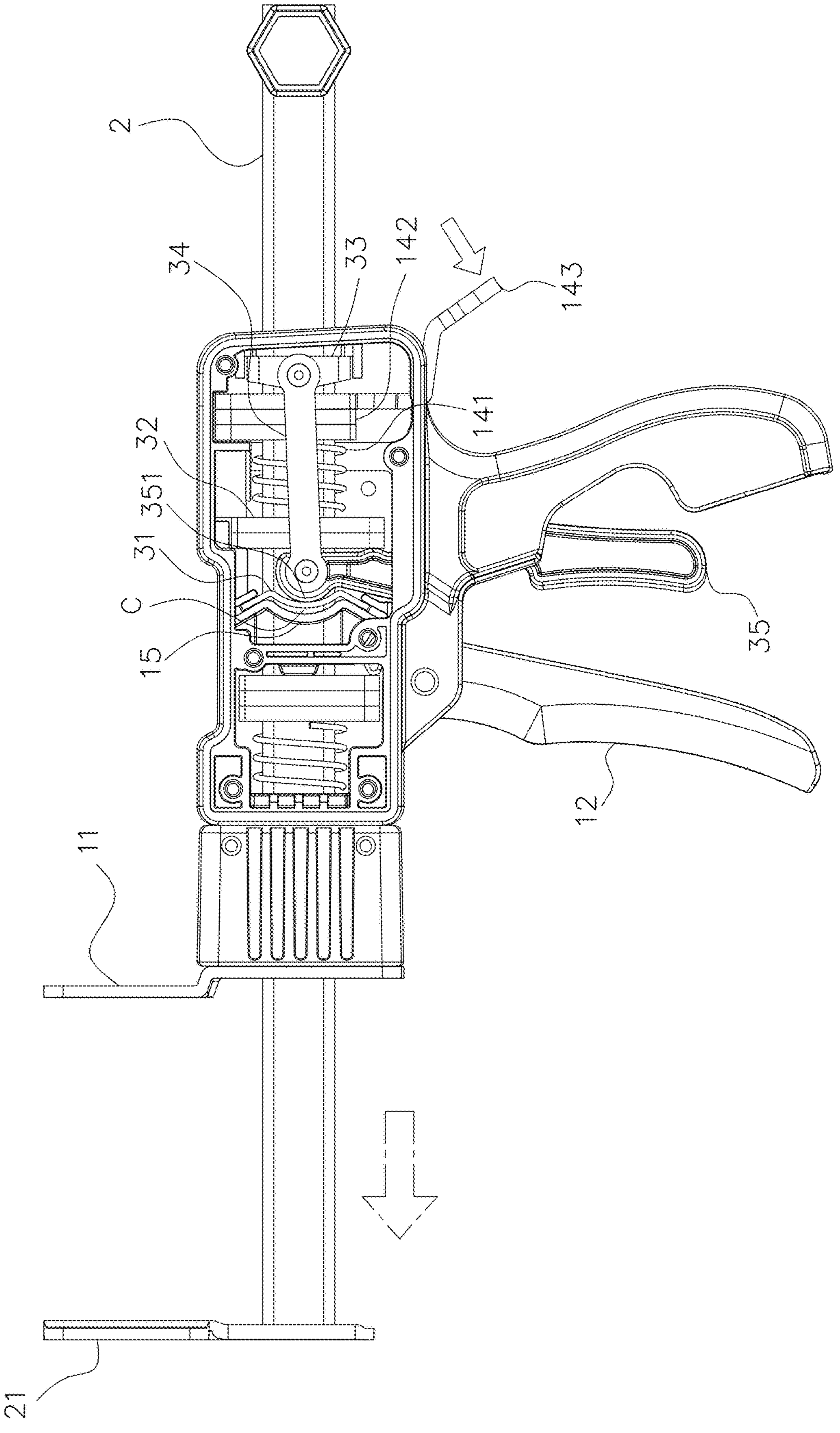
FIG. 5 is also another schematic view showing the operation of the jack according to the preferred embodiment of the present invention.

With reference to FIGS. 1-6, a jack according to a preferred embodiment of the present invention comprises: a body 10, an actuation rod 2, and a descending device 3.

The body 1 includes a first support sheet 11 formed on an end thereof, the actuation rod 2 is movably received in the body 1 and includes a second support sheet 21 formed on an end of the actuation rod 2 and corresponding to the first support sheet 11, wherein the actuation rod 2 drives the first support 11 and the second support 21 to move away from each other in a first moving direction A, and the actuation rod 2 drives the first support 11 and the second support 21 to move close to each other in a second moving direction B. The body 1 includes a drive grip 12 rotatably connected on a bottom thereof, an driving mechanism 13 received in a front section of an interior of the body 1 and configured to drive the actuation rod 2 to move in the first moving direction A via the drive grip 12. Since the driving mechanism 13 is a well-known art, further remarks are omitted.

The second support sheet 21 abuts against a ground, and the first support sheet 11 contacts with commodity, thus expanding the commodity upward. The body 1 further includes a limiter 14 accommodated in a rear section of the interior thereof, and the limiter 14 has a spring 141 and multiple first defining blocks 142, the actuation rod 2 is inserted through the multiple first defining blocks 142, an end of the spring 141 abuts against the multiple first defining blocks 142 so that the multiple first defining blocks 142 movably engages with the actuation rod 2, and the actuation rod 2 is limited to move in the second moving direction B. One first defining block 142 of the limiter 14 has a release stem 143 configured to disengage the actuation rod 2 from the multiple first defining blocks 142.

The descending device 3 includes a resilient sheet 31, multiple second defining blocks 32, a conduct element 33, a pull bar 34, and an adjustment grip 35. The resilient sheet 31 is received in a middle section of the interior of the body 1, and the body 1 includes a holder 15 defined in the interior thereof and aligned with the resilient sheet 31, wherein a force gap C is defined between the resilient sheet 31 and the holder 15. The adjustment grip 35 is rotatably connected on the bottom of the body 1 and has an actuating segment 351 configured to abut against the resilient sheet 31, the multiple defining blocks 32 are accommodated in the middle section of the interior of the body 1, and the actuation rod 2 is inserted through the multiple second defining blocks 32, wherein an end of a respective one second defining block 32 of the multiple second defining blocks 32 abuts against the spring 141, and the other end of the respective one second defining block 32 contacts with the adjustment grip 35. In a normal state, the multiple second defining blocks 32 do not engage with the actuation rod 2. The conduct element 33 is received in the rear section of the interior of the body 1 and abuts against a respective one first defining block 142 of the multiple first defining blocks 142. The pull bar 34 is inserted between the middle section and the rear section of the interior of the body 1, wherein an end of the pull bar 34 is rotatably connected with the actuating segment 351, and the other end of the pull bar 34 is rotatably connected with the conduct element 33.

Figure 6:
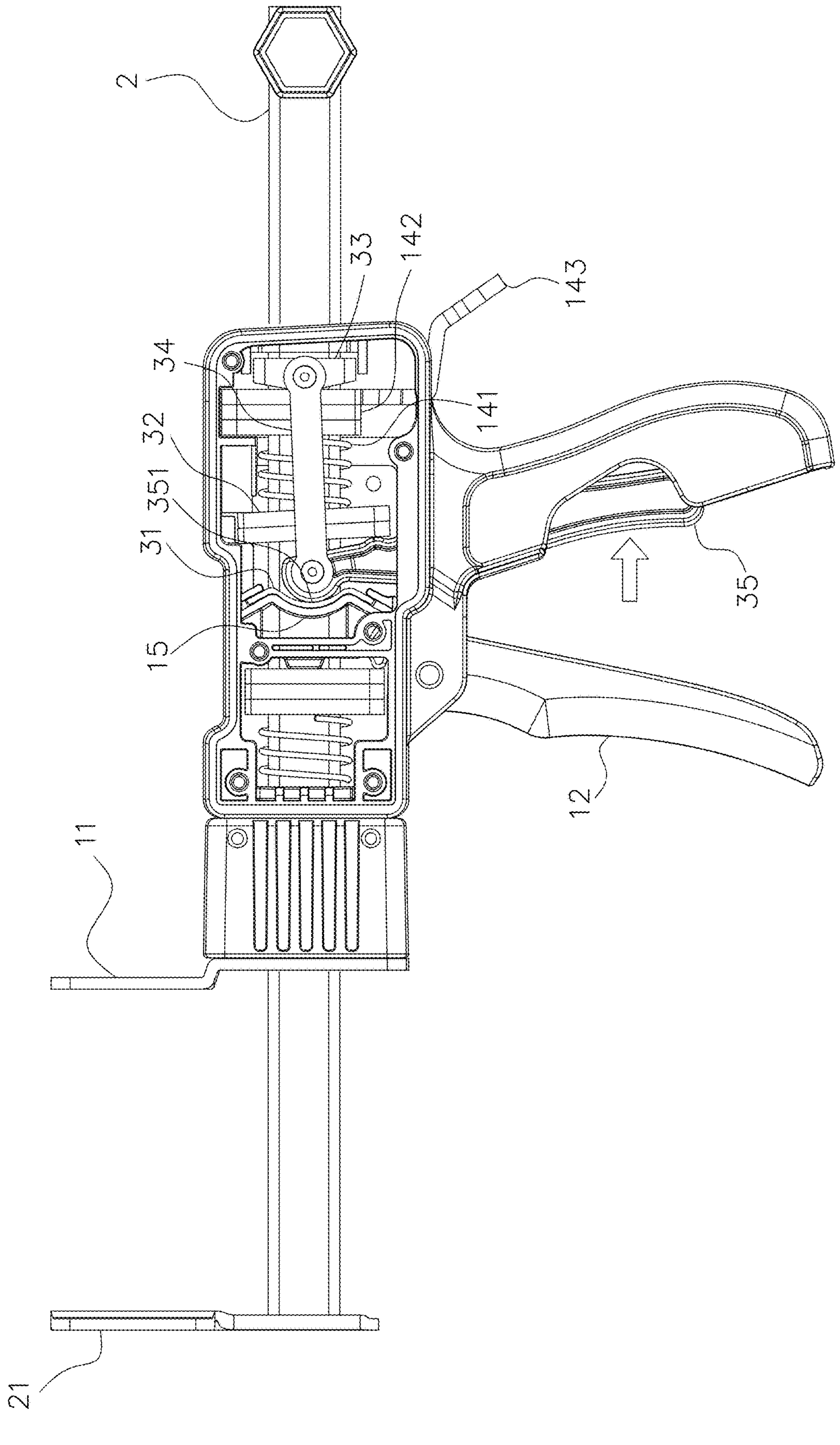
FIG. 6 is still another schematic view showing the operation of the jack according to the preferred embodiment of the present invention.

Thereby, the drive grip 12 is pressed repeatedly to drive the first support sheet 11 and the second support sheet 21 to move in the first moving direction A via the driving mechanism 13 to expand the commodity. When pressing the release stem 143, the multiple first defining blocks 142 disengage from the actuation rod 2 so that the first support sheet 11 and the second support sheet 21 to move in the second moving direction B, thus retracting the jack quickly. When the first support sheet 11 and the second support sheet 21 are applied to support heavy object (i.e. commodity), the adjustment grip 35 is pressed to drive the actuating segment 351 to force the resilient sheet 31, and the resilient sheet 31 moves into the force gap C (as shown in FIG. 6), wherein the pull bar 34 pulls the conduct element 33 to push the multiple first defining blocks 142 so that the multiple first defining blocks 142 to disengage from the actuation rod 2, and the multiple second defining blocks 32 are pushed by the adjustments grip 35 to rotatably engage with the actuation rod 2, wherein when the multiple first defining blocks 142 disengage from the actuation rod 2 and the multiple second defining blocks 32 engage with the actuation rod 2, the actuation rod 2 is not fixed by the multiple first defining blocks 142 and the multiple second defining blocks 32 instantaneously so that the actuation rod 2 moves to the second moving direction B in a gravity. When releasing the adjustment grip 35, the resilient sheet 31 pushes the pull bar 34 back so that the conduct element 33 disengages from the multiple first defining blocks 142, and the multiple first defining blocks 142 is pushed by the spring 141 to engage with the actuation rod 2. The adjustment grip 35 disengages from the multiple second defining blocks 32 so that the multiple second defining blocks 32 are pushed by the spring 141 to disengage from the actuation rod 2, thus retracting the jack gradually by pressing the adjustment grip 35 repeatedly.

Thereby, the jack is capable of expanding the commodity gradually and contains the descending device which is pressed to move the first support sheet and the second support sheet in the first moving direction or the second moving direction, thus retracting the jack gradually by pressing the adjustment grip repeatedly.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole

What is claimed is:

1. A jack comprising: a body, an actuation rod, and a descending device;

wherein the body includes a first support sheet formed on an end thereof, the actuation rod is movably received in the body and includes a second support sheet formed on an end of the actuation rod and corresponding to the first support sheet, wherein the actuation rod drives the first support and the second support to move away from each other in a first moving direction, and the actuation rod drives the first support and the second support to move close to each other in a second moving direction; the body includes a drive grip rotatably connected on a bottom thereof, an driving mechanism received in a front section of an interior of the body and configured to drive the actuation rod to move in the first moving direction via the drive grip; the body further includes a limiter accommodated in a rear section of the interior thereof, and the limiter has a spring and multiple first defining blocks, the actuation rod is inserted through the multiple first defining blocks, an end of the spring abuts against the multiple first defining blocks so that the multiple first defining blocks movably engages with the actuation rod, and the actuation rod is limited to move in the second moving direction; wherein one first defining block of the limiter has a release stem configured to disengage the actuation rod from the multiple first defining blocks;

wherein the descending device includes a resilient sheet, multiple second defining blocks, a conduct element, a pull bar, and an adjustment grip; the resilient sheet is received in a middle section of the interior of the body, and the body includes a holder defined in the interior thereof and aligned with the resilient sheet, wherein a force gap is defined between the resilient sheet and the holder; the adjustment grip is rotatably connected on the bottom of the body and has an actuating segment configured to abut against the resilient sheet, the multiple defining blocks are accommodated in the middle section of the interior of the body, and the actuation rod is inserted through the multiple second defining blocks, wherein an end of a respective one second defining block of the multiple second defining blocks abuts against the spring, and the other end of the respective one second defining block contacts with the adjustment grip; wherein the multiple second defining blocks do not engage with the actuation rod in a normal state, the conduct element is received in the rear section of the interior of the body and abuts against a respective one first defining block of the multiple first defining blocks; and the pull bar is inserted between the middle section and the rear section of the interior of the body, wherein an end of the pull bar is rotatably connected with the actuating segment, and the other end of the pull bar is rotatably connected with the conduct element.

* * * * *